United States Patent Office.

HEMAN S. LUCAS, OF CHESTER, MASSACHUSETTS.

Letters Patent No. 68,370, dated September 3, 1867.

IMPROVED PAPER-STOCK.

The Schedule referred to in these Letters Patent and making part of the same.

TO ALL WHOM IT MAY CONCERN:

Be it known that I, HEMAN S. LUCAS, of Chester, in the county of Hampden, and State of Massachusetts, have invented a new and improved Paper-Stock; and I do hereby declare that the following is a full and exact description thereof.

The nature of my invention consists in making paper-stock from a new material, to wit, from the fibre obtained from the leaves and stalks or culms of the species of grass known and described botanically as *Spartina juncea*, a plant growing abundantly on the salt marshes along the northern coast of the United States; which plant is described as follows in Gray's Botany of the northern United States, under the classification of plants of the order Graminial:

"*Spartina juncea*, (low rush salt grass,) culms low (one foot to two feet high) and slender; leaves narrow and rush-like, strongly involute; spikes one to five, short peduncled, at least the lower; glumes acute, rough serrulate on the back; the lower scarcely half the length of the upper, not half the length of the lower palea. Salt marshes and sandy sea-beach; common; August."

I have discovered, by experiments, that the fibre of the above plant, heretofore only used as an inferior fodder, by being treated with alkali for the purpose of removing the small portion of silex contained in the fibre, and by being bleached with chlorine and broken up by any of the well-known methods of breaking fibre, may be converted into a genuine paper-stock, suitable to be used alone, or for mixing with other paper-stock; this stock, in fact, being a complete substitute for imported paper-stock made from the Spanish grass, the *Stipa juncea*, now largely used in this country.

I deem it unnecessary to describe in detail the treatment by which the fibre of this plant is converted into paper-stock. It is sufficient to say that any of the well-known processes for converting vegetable fibre into paper-stock may be made use of, and that I do not limit myself to any particular process, although for the purposes of the present application I confine my claim to the use of the *Spartina juncea*. I have successfully tried for the same purpose all the other species of the genus Spartina growing upon our northern marshes; e.g., *Spartina polystachya*, (great salt reed grass) and *Spartina glabra* (smooth salt marsh grass) of Gray. I am well aware that plants of the genus Carex (or sedge) and of the order Cyperaceal (sedge family) have been used for making paper-stock, as claimed in the patent of Henry Betts. The plants of the sedge family described by him are stated, as is also well known, to be found in large quantities in and about the inland and fresh-water marshes. I disclaim the use of the fibre of any plants of the order Cyperaceal; the plant whose fibre I use being of a different order and genus, and being limited to the sea-shore and salt marshes.

What I claim as my invention, and desire to secure by Letters Patent, is—

The application of the fibres of the stalks and leaves of the plant *Spartina juncea* (or low rush salt grass) to the manfacture of paper-stock.

HEMAN S. LUCAS.

Witnesses:
 JOHN L. HAYES,
 BYRON ROSE.